US012168982B2

(12) United States Patent
Staszak et al.

(10) Patent No.: US 12,168,982 B2

(45) **Date of Patent: *Dec. 17, 2024**

(54) PORTABLE BLOWER FAN ASSEMBLY

(71) Applicant: THERMA-STOR LLC, Madison, WI (US)

(72) Inventors: Jeffrey R. Staszak, Deerfield, WI (US); Kevin Lawrence Askling, Madison, WI (US); Todd R. DeMonte, Cottage Grove, WI (US); Todd Brunner, Madison, WI (US); Matthew J. Poster, Madison, WI (US); Jenee LaPlace Mobley, Fuquay Varina, NC (US); David Treleven, Raleigh, NC (US); Xueqiao Wang, Foshan (CN); Laurence A. Carlson, Stoughton, WI (US)

(73) Assignee: THERMA-STOR LLC, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,374

(22) Filed: May 9, 2022

(65) Prior Publication Data

US 2022/0260083 A1 Aug. 18, 2022

Related U.S. Application Data

(63) Continuation of application No. 17/061,634, filed on Oct. 2, 2020, now Pat. No. 11,391,286.

(51) Int. Cl.

| | |
|---|---|
| ***F04D 19/00*** | (2006.01) |
| ***F04D 25/06*** | (2006.01) |
| ***F04D 25/16*** | (2006.01) |

(52) U.S. Cl.

CPC ........... *F04D 19/002* (2013.01); *F04D 25/06* (2013.01); *F04D 25/166* (2013.01); *F05D 2240/14* (2013.01)

(58) Field of Classification Search

CPC ........ F04D 19/002; F04D 25/06; F04D 25/08; F04D 25/088; F04D 25/166;

(Continued)

(56) References Cited

U.S. PATENT DOCUMENTS

| | | | |
|---|---|---|---|
| 2,117,310 | A | 5/1938 | Garrott |
| 5,480,282 | A | 1/1996 | Matson |

(Continued)

FOREIGN PATENT DOCUMENTS

| | | | | |
|---|---|---|---|---|
| CN | 201298198 Y | * | 8/2009 | ............... G06F 1/20 |
| CN | 107246400 A | * | 10/2017 | |

OTHER PUBLICATIONS

Price, Engineering Guide Air Distribution (Year: 2011).*

*Primary Examiner* — Alexander B Comley

(74) *Attorney, Agent, or Firm* — Baker Botts L.L.P.

(57) ABSTRACT

A portable blower fan assembly that includes a housing that forms a pair of air tunnels. The pair of air tunnels are configured to provide a first airflow path across a surface in a downward direction. The portable blower fan assembly further includes a pair of fan assemblies. Each fan assembly is positioned within one of the air tunnels with a downward angle. The portable blower fan assembly further includes a power supply that is configured to provide electrical power to the first motor and the second motor.

18 Claims, 11 Drawing Sheets

(58) Field of Classification Search
CPC ....... F04D 29/545–547; F05D 2240/14; E04B 1/7092; F26B 21/001–002
USPC ............................ 417/423.5, 423.14, 423.15
See application file for complete search history.

(56) References Cited

U.S. PATENT DOCUMENTS

| | | | | | |
|---|---|---|---|---|---|
| 5,788,467 | A * | 8/1998 | Zenitani | H05K 7/20581 | 417/423.5 |
| 5,947,189 | A * | 9/1999 | Takeuchi | F04D 25/06 | 123/41.31 |
| 6,042,348 | A * | 3/2000 | Aakalu | H05K 7/2019 | 417/427 |
| 6,340,283 | B1 * | 1/2002 | Hedger | F04D 25/166 | 416/246 |
| 6,491,502 | B2 * | 12/2002 | Hunt | F04D 25/166 | 416/189 |
| 6,821,095 | B2 | 11/2004 | Dooley et al. | | |
| 7,357,620 | B2 * | 4/2008 | Russak | F04D 25/166 | 415/213.1 |
| 7,601,005 | B1 * | 10/2009 | Lai | F04D 25/088 | 439/12 |
| D683,011 | S * | 5/2013 | Chen | D23/370 | |
| 8,579,582 | B1 * | 11/2013 | Gehring | F04D 29/60 | 415/222 |
| 9,822,801 | B2 * | 11/2017 | Nakagawa | F04D 29/542 | |
| 9,913,401 | B2 * | 3/2018 | Gonzalez Inda | F04D 29/646 | |
| 9,961,801 | B2 * | 5/2018 | Kwon | H05K 7/20009 | |
| 10,411,578 | B2 * | 9/2019 | Cheng | F04D 25/024 | |
| 10,578,126 | B2 * | 3/2020 | Cermak | F04D 29/542 | |
| 10,655,640 | B1 * | 5/2020 | Dickinson | F04D 17/162 | |
| 2005/0058558 | A1 * | 3/2005 | Gajewski | F04D 25/105 | 417/423.1 |
| 2005/0232753 | A1 * | 10/2005 | Hopkins | F24F 11/74 | 415/119 |
| 2007/0297912 | A1 * | 12/2007 | Reuter | F04D 25/0606 | 416/93 R |
| 2007/0297914 | A1 | 12/2007 | Reuter | | |
| 2008/0038111 | A1 * | 2/2008 | Iwasaki | F04D 25/166 | 415/198.1 |
| 2012/0156019 | A1 * | 6/2012 | Gong | G06F 1/20 | 415/182.1 |
| 2013/0108435 | A1 * | 5/2013 | Zhou | G06F 1/20 | 415/213.1 |
| 2013/0142642 | A1 * | 6/2013 | Liu | H05K 7/20172 | 415/213.1 |
| 2014/0076828 | A1 * | 3/2014 | Liu | H05K 7/20172 | 211/26 |
| 2015/0132160 | A1 * | 5/2015 | Ha | F04D 25/166 | 417/410.1 |
| 2015/0377480 | A1 * | 12/2015 | Mitchell | F21V 33/0096 | 362/96 |
| 2016/0076546 | A1 * | 3/2016 | Arnold | F04D 19/002 | 416/179 |
| 2016/0238263 | A1 * | 8/2016 | Meissner | F04D 29/663 | |
| 2017/0152854 | A1 * | 6/2017 | Gebert | F04D 29/325 | |
| 2018/0017063 | A1 * | 1/2018 | Morse | F04D 27/005 | |
| 2018/0106266 | A1 * | 4/2018 | Bertels | F04D 29/522 | |
| 2019/0063447 | A1 * | 2/2019 | Wang | F04D 25/10 | |
| 2019/0316601 | A1 * | 10/2019 | Shimamoto | H05K 7/20172 | |
| 2019/0353037 | A1 * | 11/2019 | Liu | F04D 25/0613 | |

* cited by examiner

PORTABLE BLOWER FAN ASSEMBLY

CROSS-REFERENCE TO RELATED APPLICATIONS

This application is a continuation of U.S. patent application Ser. No. 17/061,634 filed Oct. 2, 2020, by Jeffrey R. Staszak et al., and entitled "PORTABLE BLOWER FAN ASSEMBLY," which is incorporated herein by reference.

TECHNICAL FIELD

The present disclosure relates generally to a portable blower fan assembly, and more specifically a portable blower fan assembly for increasing airflow in an area.

BACKGROUND

Residential and commercial properties are susceptible to water damage from things like floods or broken pipes. When a flood occurs, a large amount of water can saturate different surfaces of a property. For example, water may soak into the floors, walls, or a ceiling of a property. Allowing wet surfaces to dry from only ambient air is not a viable option. The reason for this is because wet surfaces can take several hours or days to dry depending on the amount of water saturation. This long drying time may result in trapped moisture within surfaces that can lead to mold, mildew, and other types of potential health hazards.

SUMMARY

The system disclosed in the present application provides a technical solution to the problems discussed above by using a portable blower fan assembly that is configured to increase the airflow within an area. The portable blower fan assembly is configurable in a variety of positions that allows the portable blower fan assembly to concentrate an increased airflow onto one or more wet surfaces. For example, the portable blower fan assembly may be configured to move air across a floor surface in a downward direction. As another example, the portable blower fan assembly may be configured to move air directly below the portable blower fan assembly onto a floor surface. As another example, the portable blower fan assembly may be configured to move air directly above the portable blower fan assembly onto a ceiling surface. As another example, the portable blower fan assembly may be configured to move air at an angle toward a vertical wall or stairs. By concentrating the increased airflow onto wet surfaces, the portable blower fan assembly is able to reduce the amount of time required to dry surfaces. Reducing the amount of time required to dry the surface reduces the likelihood of mold and mildew from forming on a surface.

In one embodiment, a portable blower fan assembly includes a housing that forms a pair of air tunnels that each contain a fan assembly. The pair of air tunnels are configured to provide a first airflow path across a surface in a downward direction when the fan assemblies are activated. Each fan assembly is positioned within one of the air tunnels with a downward angle. The portable blower fan assembly further includes a power supply that is configured to provide electrical power to the fan assemblies. In some embodiments, the portable blower fan assembly may further include focus corners and/or positioning legs. The focus corners are located on a lower portion of the exhaust side on the portable blower fan assembly. The focus corners are configured to reduce the pressure at the base of the portable blower fan assembly which helps to draw air in a downward direction. The positioning legs are configurable to change the direction of airflow provided by the portable blower fan assembly. For example, the positioning legs may be configured to lift the portable blower fan assembly about a ground surface to direct airflow in an upward or downward direction. As another example, the positioning legs may be configured to tilt the portable blower fan assembly to provide an angled airflow toward a vertical surface or stairs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Portable Blower Fan Assembly Overview

Figure 1:
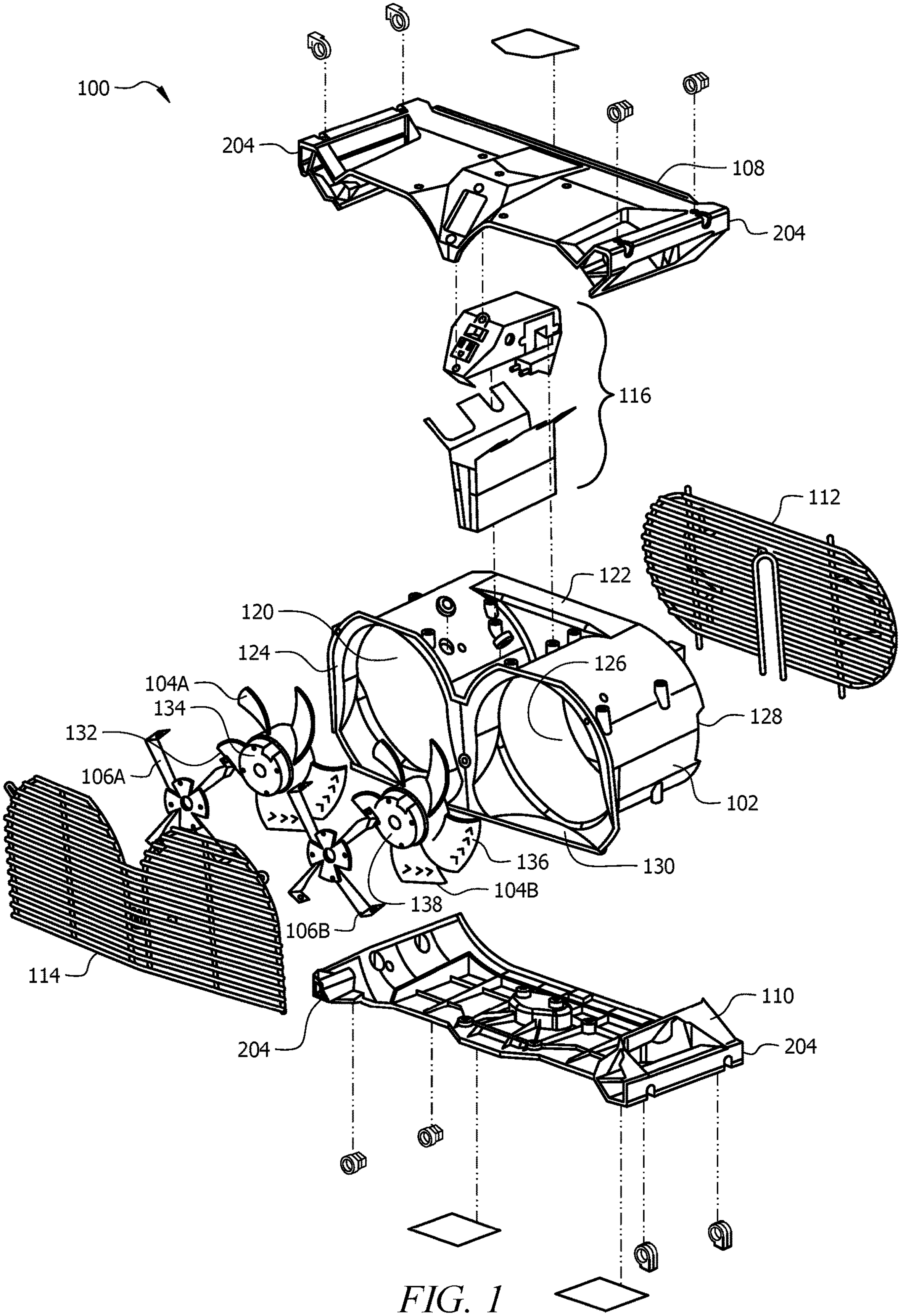
FIG. 1 is an exploded view of an embodiment of a portable blower fan assembly.

FIG. 1 is an exploded view of an embodiment of a portable blower fan assembly 100. The portable blower fan assembly 100 is a device that is configured to provide increased airflow to a location or a worksite. Examples of a worksite include, but are not limited to, a home, an apartment, an office, a building, or any other suitable type of location. For example, the portable blower fan assembly 100 may be used to dry one or more wet surfaces at a location. For instance, the portable blower fan assembly 100 may be used in a home that contains one or more wet surfaces from a flood. In this example, an operator will position a portable blower fan assembly 100 adjacent to one of the wet surfaces within the home. In other examples, the portable blower fan assembly 100 may be used to provide airflow for ventilating an area or any other suitable type of application that requires an increase in airflow.

In one embodiment, the portable blower fan assembly 100 comprises a housing 102, a first fan assembly 104A, a second fan assembly 104B, curved stator vanes 106, an upper housing cover 108, a lower housing cover 110, an intake grill 112, an exhaust grill 114, and a power supply 116. The portable blower fan assembly 100 may be configured as shown or in any other suitable configuration.

Housing

The housing 102 may be formed of plastic or any other suitable type of material. The housing 102 comprises a first air tunnel 120 and a second air tunnel 126 that are each configured to house a pair of fan assemblies 104 and to provide an airflow path through the portable blower fan assembly 100. In one embodiment, the first air tunnel 120 and the second air tunnel 126 each have a cylindrical shape. In other embodiments, the first air tunnel 120 and the second air tunnel 126 may be configured to have any other suitable shape. The first air tunnel 120 comprises an intake portion 122 and an exhaust portion 124. The intake portion 122 is configured to provide an airflow path into the first air tunnel 120. The exhaust portion 124 is configured to provide an airflow path out of the first air tunnel 120. Similarly, the second air tunnel 126 comprises an intake portion 128 and an exhaust portion 130. The intake portion 128 is configured to provide an airflow path into the second air tunnel 126. The exhaust portion 130 is configured to provide an airflow path out of the second air tunnel 126. In one embodiment, the housing 102 is configured to position the pair fan assemblies 104 with a downward angle toward a surface that is below the portable blower fan assembly 100. An example of this configuration is described in more detail in FIG. 3.

Fan Assemblies

The first fan assembly 104A is disposed within the first air tunnel 120 between the intake portion 122 and the exhaust portion 124 of the first air tunnel 120. The first fan assembly 104A comprises a first fan blade 132 and a first motor 134. In one embodiment, the first fan blade 132 may be configured to have a blade angle between zero and three degrees. The first fan blade 132 may also be configured with a blade diameter between one hundred eighty and two hundred millimeters. In other examples, the first fan blade 132 may be configured with any other suitable blade angle and/or blade diameter. The first motor 134 is an electrical motor that is configured to apply a rotation force to the first fan blade 132 to draw in air from the intake portion 122 of the first air tunnel 120 and to push the drawn air out the exhaust portion 124 of the first air tunnel 120.

Similarly, the second fan assembly 104B is disposed within the second air tunnel 126 between the intake portion 128 and the exhaust portion 130 of the second air tunnel 126. The second fan assembly 104B comprises a second fan blade 136 and a second motor 138. The second fan blade 136 is configured similar to the first fan blade 132. The second motor 138 is an electrical motor that is configured to apply a rotation force to the second fan blade 136 to draw in air from the intake portion 128 of the second air tunnel 126 and to push the drawn in air out the exhaust portion 130 of the second air tunnel 126. The portable blower fan assembly 100 may be configured with the first fan assembly 104A and the second fan assembly 104B to be spaced between one to six inches from each other. For example, the first fan assembly 104A and the second fan assembly 104B may be configured to be about two inches from each other.

Curved Stator Vanes

In one embodiment, the portable blower fan assembly 100 comprises a first curved stator vane 106A that is disposed at the exhaust portion 124 of the first air tunnel 120 and a second curved stator vane 106B that is disposed at the exhaust portion 130 of the second air tunnel 126. The first curved stator vane 106A is configured to apply a rotation to air that passes through the first air tunnel 120. Similarly, the second curved stator vane 106B is configured to apply a rotation to the air that passes through the second air tunnel 126. In this configuration, the first curved stator vane 106A and the second curved stator vane 106B are configured to increase the velocity of the air that passes through the portable blower fan assembly 100 by applying a rotation to the air the exits the portable blower fan assembly 100. In FIG. 1, the curved stator vanes 106A and 106B are each illustrated as having four legs that form an 'x' shape. In other examples, the curved stator vane 106*a* and 106B may comprise any other suitable number of legs.

Housing Covers

The upper housing cover 108 and the lower housing cover 110 are generally configured to provide support or protection for the components (e.g. the power supply 116 and the fan assemblies 104) of the portable blower fan assembly 100. The upper housing cover 108 is coupled to an upper portion of the housing 102. The upper housing cover 108 may be attached to the housing 102 using a plurality of fasteners (e.g. screws, bolts, or clips). In embodiments, the upper housing cover 108 may be integrated with the housing 102 within a single structure. The lower housing cover 110 is coupled to a lower portion of the housing 102. The lower housing cover 110 may be attached to the housing 102 using a plurality of fasteners (e.g. screws, bolts, or clips). In embodiments, the lower housing cover 110 may be integrated with the housing 102 within a single structure.

The upper housing cover 108 comprises a first pair of channels 204. Each channel 204 comprises an opening that extends from the intake side of the portable blower fan assembly 100 to the exhaust side of the portable blower fan assembly 100. Each channel 204 comprises an opening that is configured to allow a positioning leg 702 to be disposed at least partially within the channel 204. Examples of this configuration are described in FIGS. 7 and 8. The lower housing cover 110 comprises a second pair of channels 204 that are configured similar to the first pair of channels 204.

Grills

The intake grill 112 and the exhaust grill 114 are generally configured to prevent objects from entering the portable blower fan assembly 100 which protects the fan assemblies 104 within the portable blower fan assembly 100. The intake grill 112 is configured to cover the intake portions of the first air tunnel 120 and the second air tunnel 126 of the housing 102. The intake grill 112 comprises a plurality of slots or openings that allows air to be drawn into the portable blower fan assembly 100. The slots or openings of the intake grill 112 are sized to prevent larger objects from entering the intake side of the portable blower fan assembly 100. The exhaust grill 114 is configured to cover the exhaust portions of the first air tunnel 120 and the second air tunnel 126 of the housing 102. The exhaust grill 114 comprises a plurality of slots or openings that allows air to exit the portable blower fan assembly 100. The slots or openings of the intake grill 112 are also sized to prevent larger objects from entering the exhaust side of the portable blower fan assembly 100. The intake grill 112 and the exhaust grill 114 may be coupled to the housing 102 using a plurality of fasteners (e.g. screws, bolts, or clips).

Power Supply

The power supply 116 is electrically coupled to the first motor 134 and the second motor 138. The power supply 116 is configured to provide electrical power to the first motor 134 and the second motor 138. The power supply 116 may comprise motor driving electronics, an inverter, a microprocessor, a power cord, and any other suitable components for providing electrical power to the first motor 134 and the second motor 138. In some embodiments, the power supply 116 may also be configured to provide electrical power to any other electronic devices. In one embodiment, the power supply 116 may be installed between an upper portion of the housing 102 and the upper housing cover 108. In other embodiments, the power supply 116 may be installed in any other suitable location on the portable blower fan assembly 100. In some embodiments, the power supply 116 may comprise one or more electrical plug outlets that allows other electronic devices to be plugged into the power supply 116. For example, the one or more electrical plug outlets may allow multiple portable blower fan assemblies 100 to be daisy-chained together.

Assembled Portable Blower Fan Assembly

Figure 2:
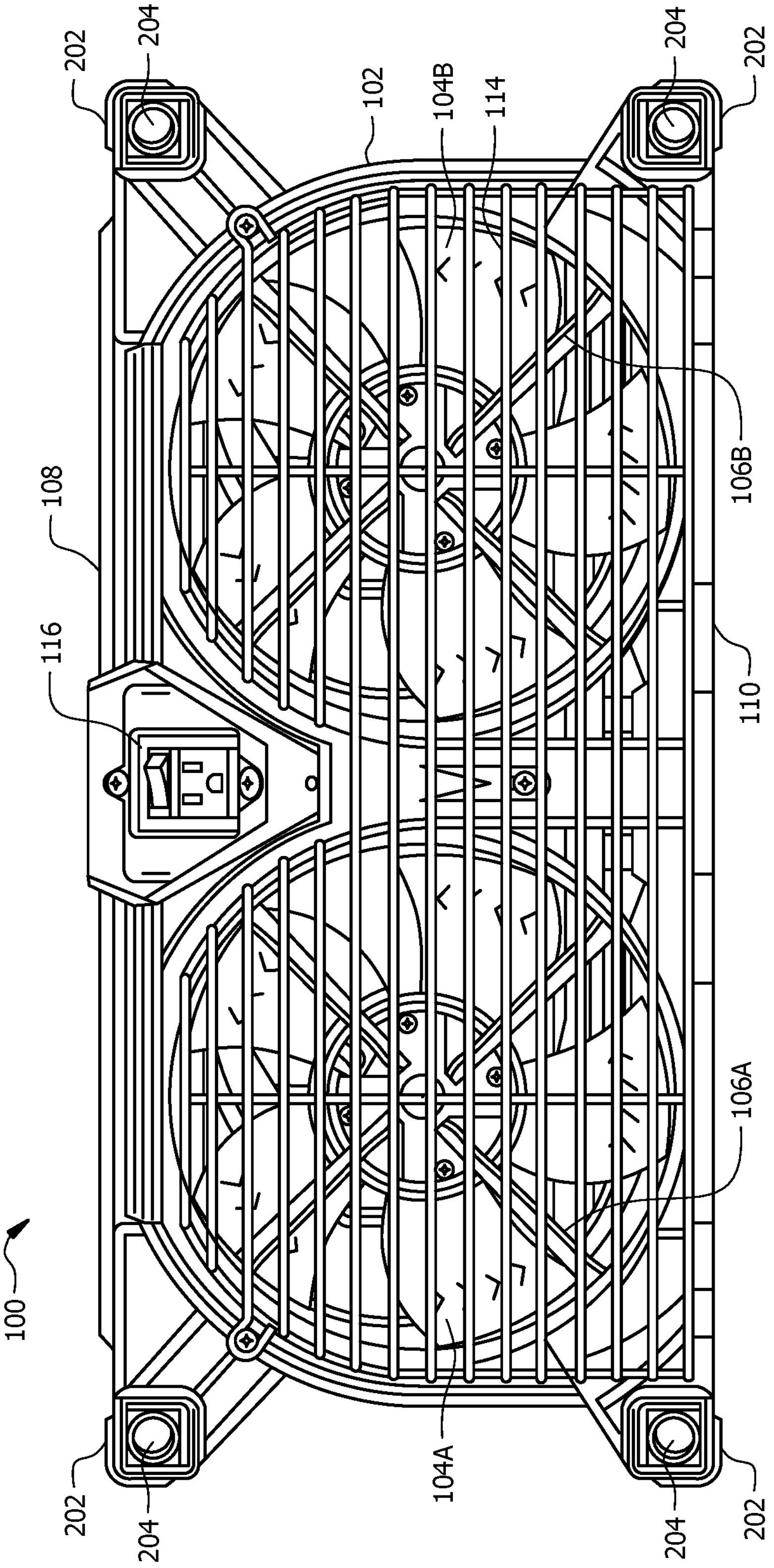
FIG. 2 is a front view of an embodiment of a portable blower fan assembly.
Figure 3:
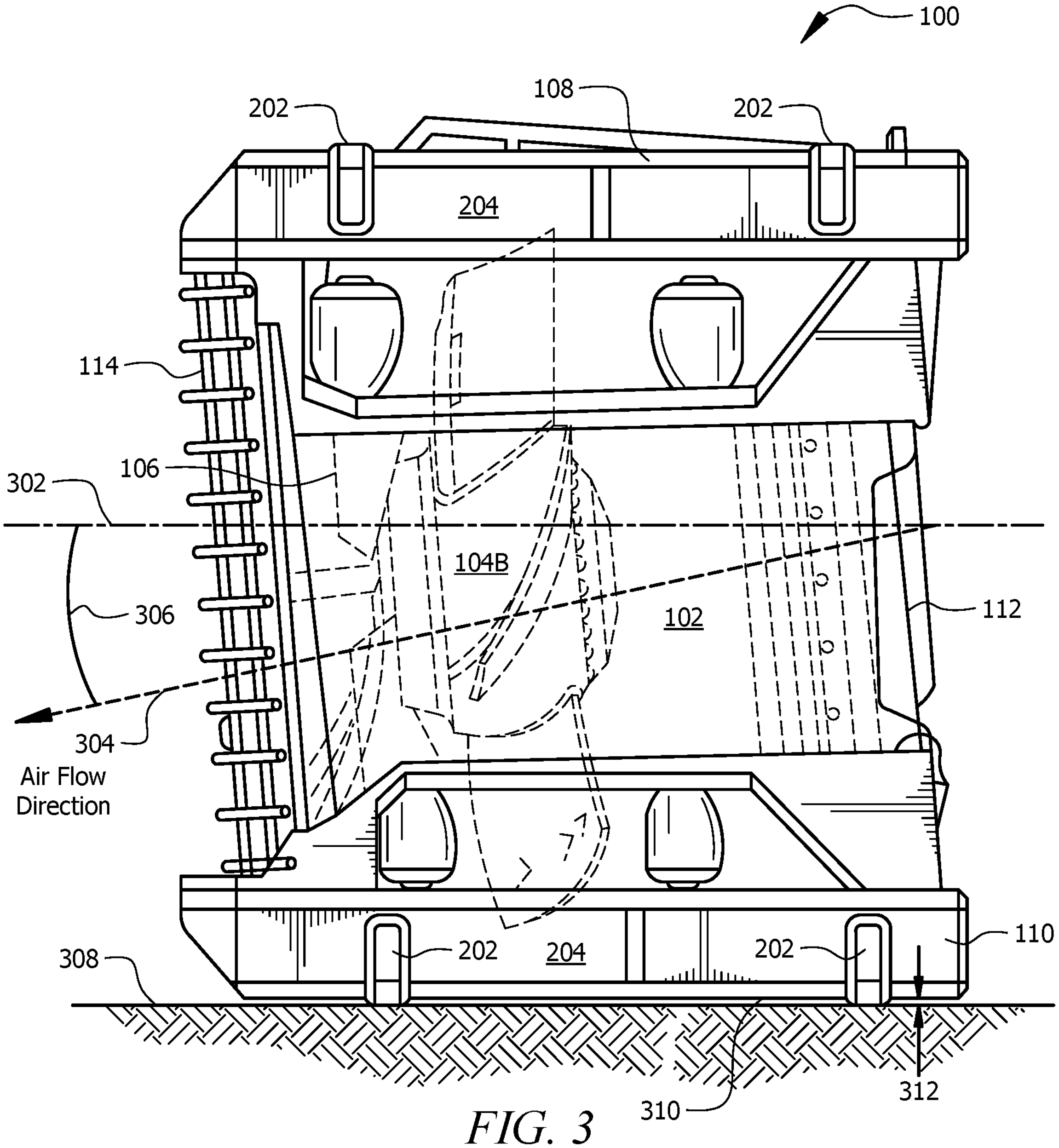
FIG. 3 is a side view of an embodiment of a portable blower fan assembly.
Figure 4:
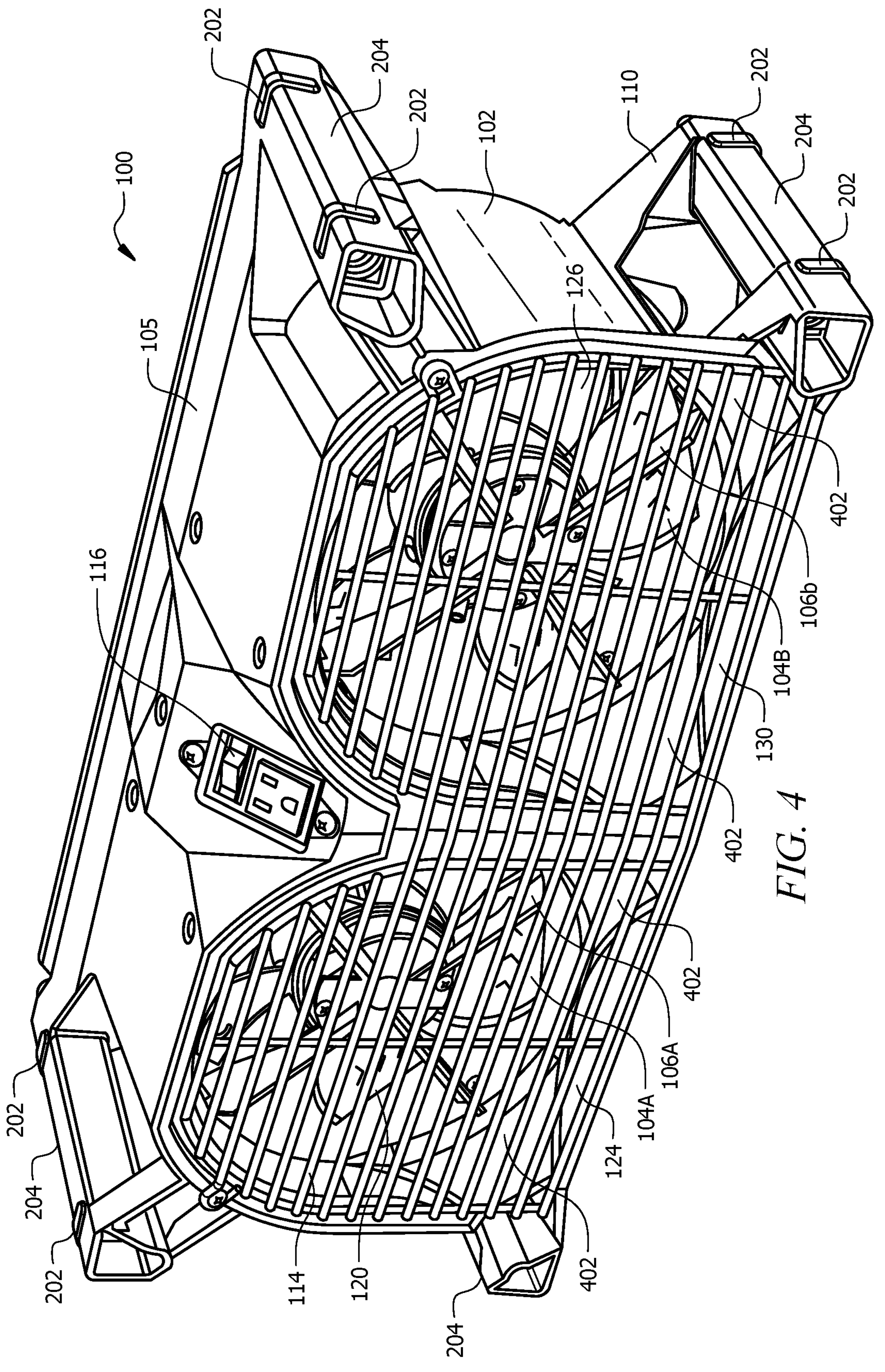
FIG. 4 is a perspective view of an embodiment of a portable blower fan assembly.

FIGS. 2-4 illustrate different views of an embodiment of an assembled portable blower fan assembly 100. FIG. 2 is a front view of an embodiment of a portable blower fan assembly 100. In FIG. 2, the channels 204 are illustrated as having a circular opening that extends completely through the upper housing cover 108 and the lower housing cover 110. In other examples, the channels 204 may be any other suitable shape (e.g. square or hexagon) that extends completely through the upper housing cover 108 and the lower housing cover 110.

FIG. 3 is a side view of an embodiment of a portable blower fan assembly 100. In FIG. 3, the fan assemblies 104 are configured to provide a downward airflow path 304. The airflow path is directed at a downward angle 306 below the centerline 302 of the portable blower fan assembly 100. In one embodiment, the downward angle 306 may be a fixed angle between five degrees and forty-five degrees. In other embodiments, the downward angle 306 may be adjustable. In this configuration, the fan assemblies 104A and 104B are configured to direct air towards a surface 308 that the portable blower fan assembly 100 is resting on, for example on the ground.

In some embodiments, the portable blower fan assembly 100 further comprises a plurality of vibration dampening feet 202. In FIG. 3, the portable blower fan assembly 100 is configured with two vibration dampening feet 202 on each of the channels 204. In other examples, the portable blower fan assembly 100 may be configured with any other suitable number of vibration dampening feet 202. The vibration dampening feet 202 are configured to resist movement of the portable blower fan assembly 100 that is caused by vibrations from the fan assemblies 104 during operation. The plurality of vibration dampening feet 202 may be formed from an elastomeric material or any other suitable type of material. The vibration dampening feet 202 are configured with a thickness 312 that prevents a bottom surface 310 of the portable blower fan assembly 100 from contacting the surface 308 that the portable blower fan assembly 100 is resting on. This configuration prevents moisture from being trapped underneath the portable blower fan assembly 100 while operating. The vibration dampening feet 202 may be configured to cover multiple surfaces of the channel 204. This configuration allows the vibration dampening feet 202 to resist movement of the portable blower fan assembly 100 when it is oriented as shown in FIGS. 2 and 3 or when it is oriented on its side.

FIG. 4 is a perspective view of an embodiment of a portable blower fan assembly 100. In some embodiments, the portable blower fan assembly 100 may further comprise a plurality of focus corners 402. A focus corner 402 is a portion of the housing 102 with a curved or sloped surface that gradually directs air to an area onto the surface that the portable blower fan assembly 100 is resting on. The focus corners 402 are configured to reduce the pressure at the base of the portable blower fan assembly 100 which helps to draw air in a downward direction. In FIG. 4, the portable blower fan assembly 100 comprises a first pair of focus corners 402 that are located on a lower portion of the exhaust portion 124 of the first air tunnel 120. The first pair of focus corners 402 are configured to provide an airflow path in a downward direction from the intake portion 122 to the exhaust portion 124 of the first air tunnel 120. The portable blower fan assembly 100 also comprises a second pair of focus corners 402 that are located on a lower portion of the exhaust portion 130 of the second air tunnel 126. The second pair of focus corners 402 are configured to provide an airflow path in a downward direction from the intake portion 128 to the exhaust portion 130 of the second air tunnel 126.

Stacking Portable Blower Fan Assemblies

Figure 5:
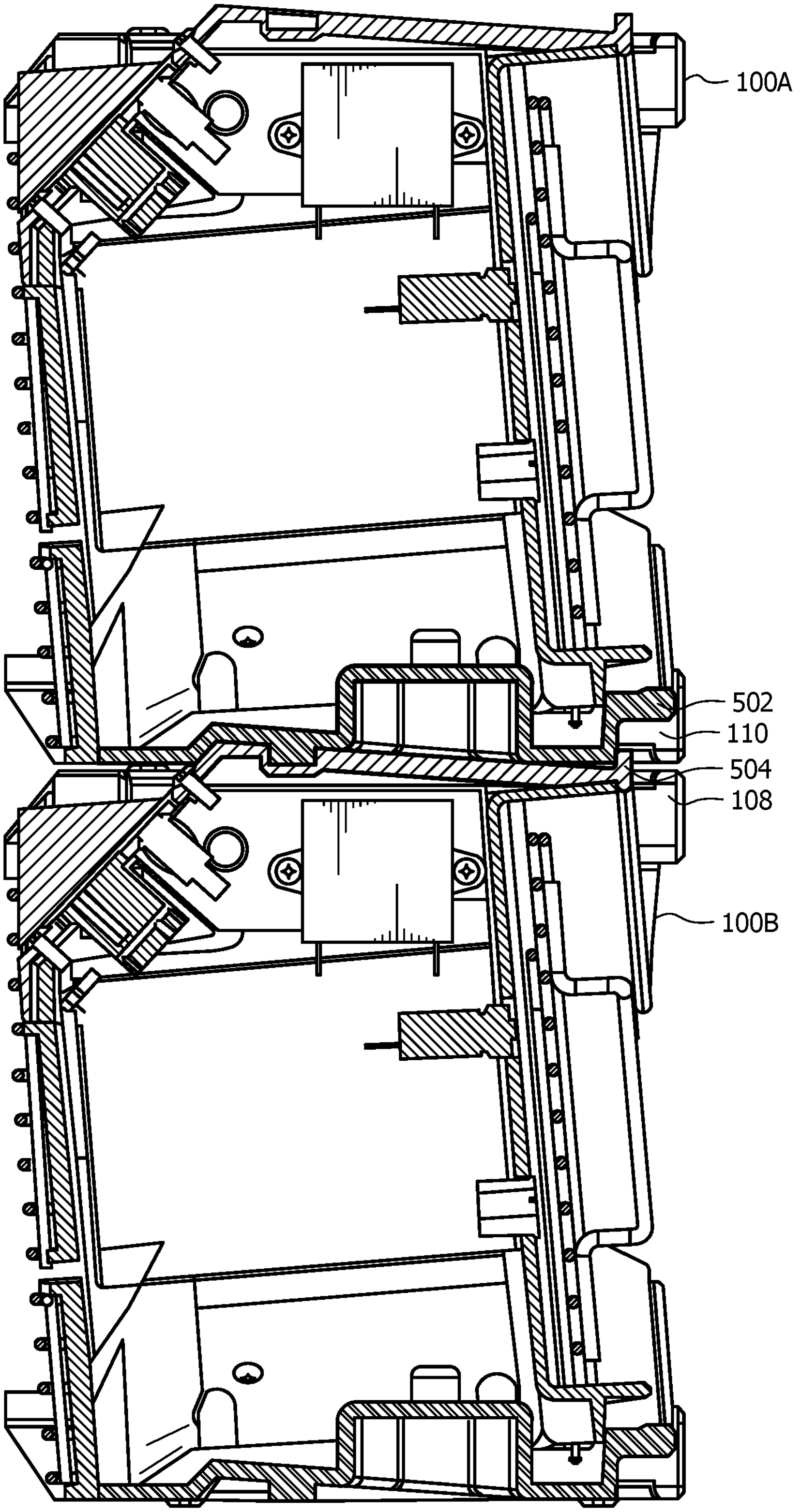
FIG. 5 is a side view of an embodiment of a pair of stacked portable blower fan assemblies.
Figure 6:
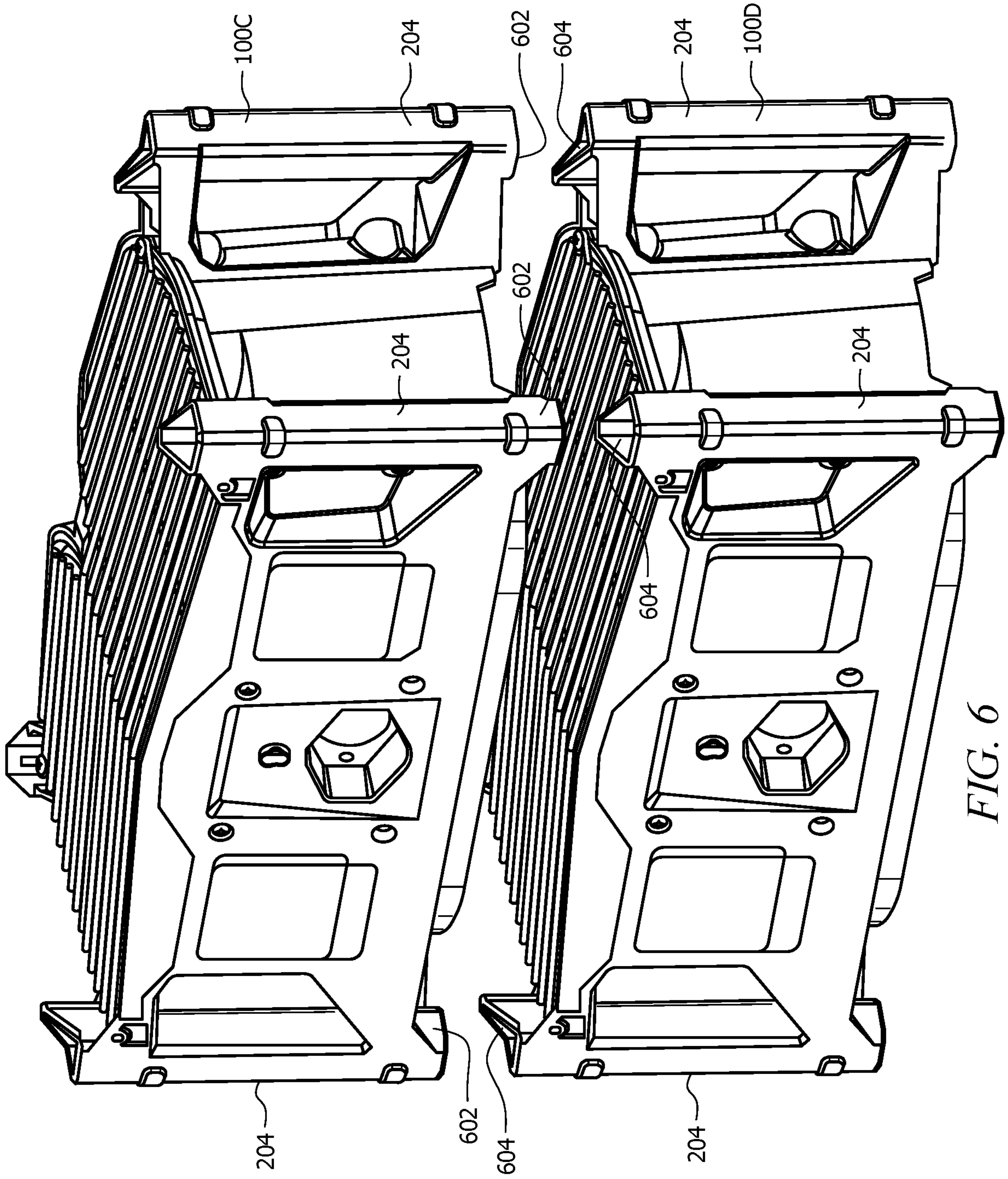
FIG. 6 is a side view of another embodiment of a pair of stacked portable blower fan assemblies.

FIGS. 5 and 6 illustrate embodiments of how multiple portable blower fan assemblies 100 can be combined or stacked for storage or transportation. FIG. 5 is a side view of an embodiment of a pair of stacked portable blower fan assemblies 100. In FIG. 5, a pair of portable blower fan assemblies 100 are stacked such that the lower housing cover 110 of a first portable blower fan assembly 100A rests on top of the upper housing cover 108 of a second portable blower fan assembly 100B. In this configuration, the lower housing cover 110 of the first portable blower fan assembly 100A comprises an interface 502 that is configured to interlock with an interface 504 on the upper housing cover 108 of the second portable blower fan assembly 100B. The interfaces 502 and 504 may comprise any suitable combination of surfaces or grooves that allows the first portable blower fan assembly 100A to interlock with the second portable blower fan assembly 100B. For example, the lower housing cover 110 of the first portable blower fan assembly 100A may comprise one or more recesses that are configured to mate with one or more protrusions from the upper housing cover 108 of the second portable blower fan assembly 100B.

FIG. 6 is a side view of another embodiment of a pair of stacked portable blower fan assemblies 100. In FIG. 6, a pair of portable blower fan assemblies 100 are stacked such that an intake side of a first portable blower fan assembly 100C rests on top of an exhaust side of a second portable blower fan assembly 100D. In this configuration, the channels 204 of the first portable blower fan assembly 100C comprise an interface 602 that is configured to mate with an interface 604 on the channels 204 of the second portable blower fan assembly 100D. The interfaces 602 and 604 may comprise any suitable combination of surfaces or grooves that allows the first portable blower fan assembly 100C to interlock with the second portable blower fan assembly 100D.

Portable Blower Fan Assembly with Positioning Lees

Figure 7:
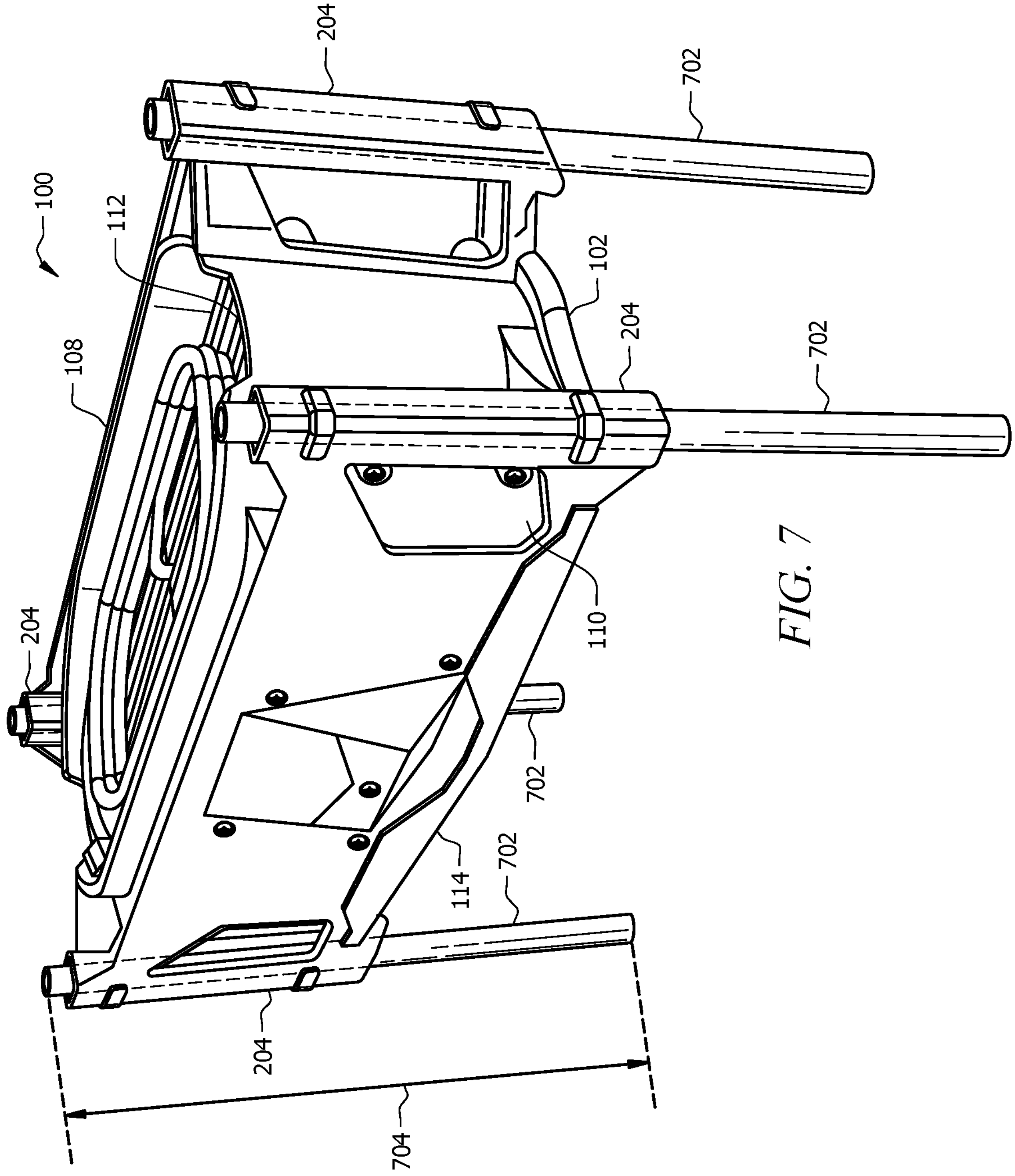
FIG. 7 is a perspective view of an embodiment of a portable blower fan assembly with positioning legs.
Figure 8:
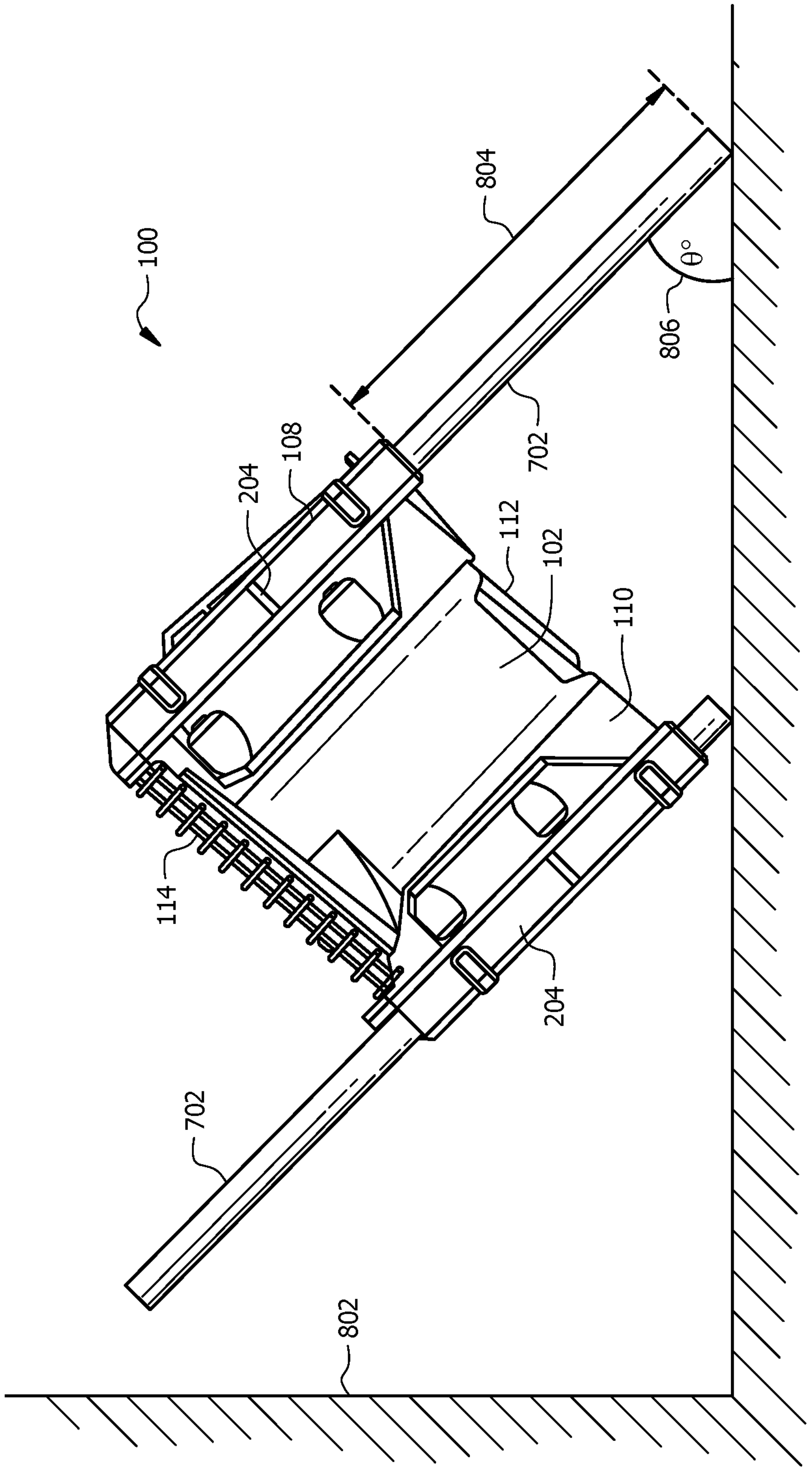
FIG. 8 is a side view of another embodiment of a portable blower fan assembly with positioning legs.

FIGS. 7 and 8 illustrate embodiments of how to use positioning legs 702 with the portable blower fan assembly 100. The positioning legs 702 are configurable to allow the portable blower fan assembly 100 to be oriented for providing airflow at different angles for drying surfaces. For example, the portable blower fan assembly 100 may use positioning legs 702 to provide airflow to a ground surface, a ceiling surface, a vertical wall, stairs, or any other type of surface.

FIG. 7 is a perspective view of an embodiment of a portable blower fan assembly 100 with positioning legs 702. The positioning legs 702 may be formed of plastic, aluminum, or any other suitable type of material. Each positioning leg 702 is configured to be at least partially disposed within a channel 204 of the portable blower fan assembly 100. Each positioning leg 702 can also be configured to extend at least partially outside of a channel 204 of the portable blower fan assembly 100. For example, in FIG. 7, the portable blower fan assembly 100 comprises positioning leg 702 within each of the channels 204. In this example, the positioning legs 702 are configured to extend outside of the channels 204 to position the portable blower fan assembly 100 above a ground surface.

In some embodiments, the positioning legs 702 are configured to have an adjustable length 704. For example, the positioning legs 702 may be telescopic which allows their length 704 to be adjusted. In other examples, the positioning legs 702 may use any other suitable technique that allows their length 704 to be adjusted. The positioning legs 702 may be configured such that the length 704 of each positioning leg 702 is independently adjustable. In other words, the length 704 of a positioning leg 702 can be adjusted independently without adjusting the other positioning legs 702.

In some embodiments, the positioning legs 702 are removable from the portable blower fan assembly 100. For example, a positioning leg 702 may be installed into a channel 204 by sliding the positioning leg 702 into the channel 204. The positioning leg 702 can then be removed from the channel 204 by sliding the positioning leg 702 out of the channel 204. In other examples, a positioning leg 702 may be installed into channel 204 using friction, threaded connections, fasteners, or any other suitable coupling technique.

In FIG. 7, the positioning legs 702 are configured to orient the portable blower fan assembly 100 to provide airflow in a vertical direction toward a ceiling surface or in a downward direction toward a ground surface. For example, the portable blower fan assembly 100 draws in air from near a ground surface and directs the drawn in air upwards toward a surface above the portable blower fan assembly 100 (e.g. a ceiling surface). As another example, the portable blower fan assembly 100 draws in air from above the portable blower fan assembly 100 and directs the drawn in air downward toward a surface below the portable blower fan assembly 100 (e.g. a ground surface).

FIG. 8 is a side view of another embodiment of a portable blower fan assembly 100 with positioning legs 702. In FIG. 8, the positioning legs 702 are configured to the portable blower fan assembly 100 to provide airflow in an angled direction, for example, toward a vertical wall 802. The length 804 of the positioning legs 702 that extends outside of the channels 204 may be adjusted to control the angle 806 of airflow from the portable blower fan assembly 100. For example, the length 804 of the positioning legs 702 that extends outside of the channels 204 may be increased to reduce the angle 806 of airflow from the portable blower fan assembly 100. The length 804 of the positioning legs 702 that extends outside of the channels 204 may be decreased to increase the angle 806 of airflow from the portable blower fan assembly 100.

Portable Blower Fan Assembly with Cable Management

Figure 9:
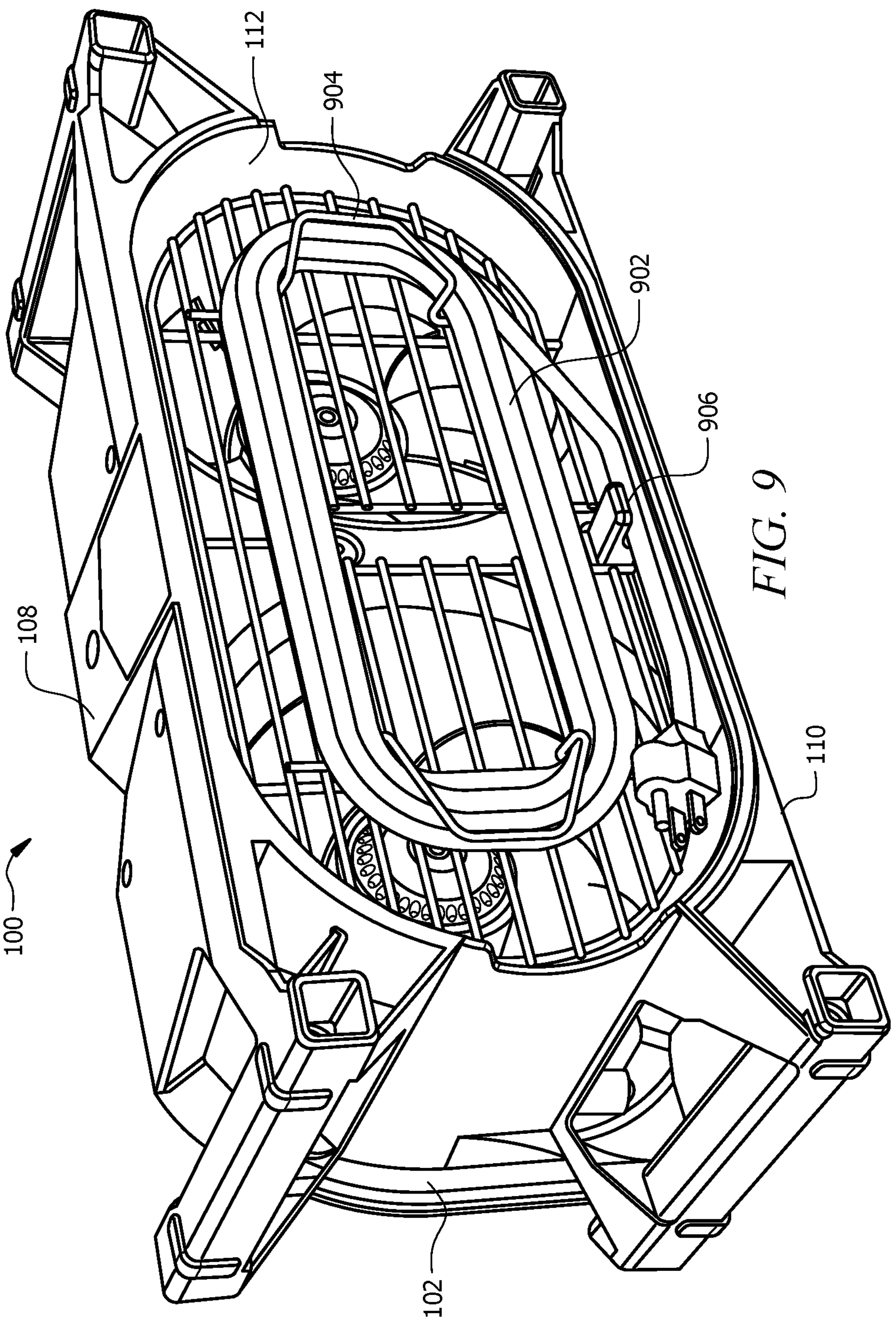
FIG. 9 is a perspective view of an embodiment of a cable management system for a portable blower fan assembly.
Figure 10:
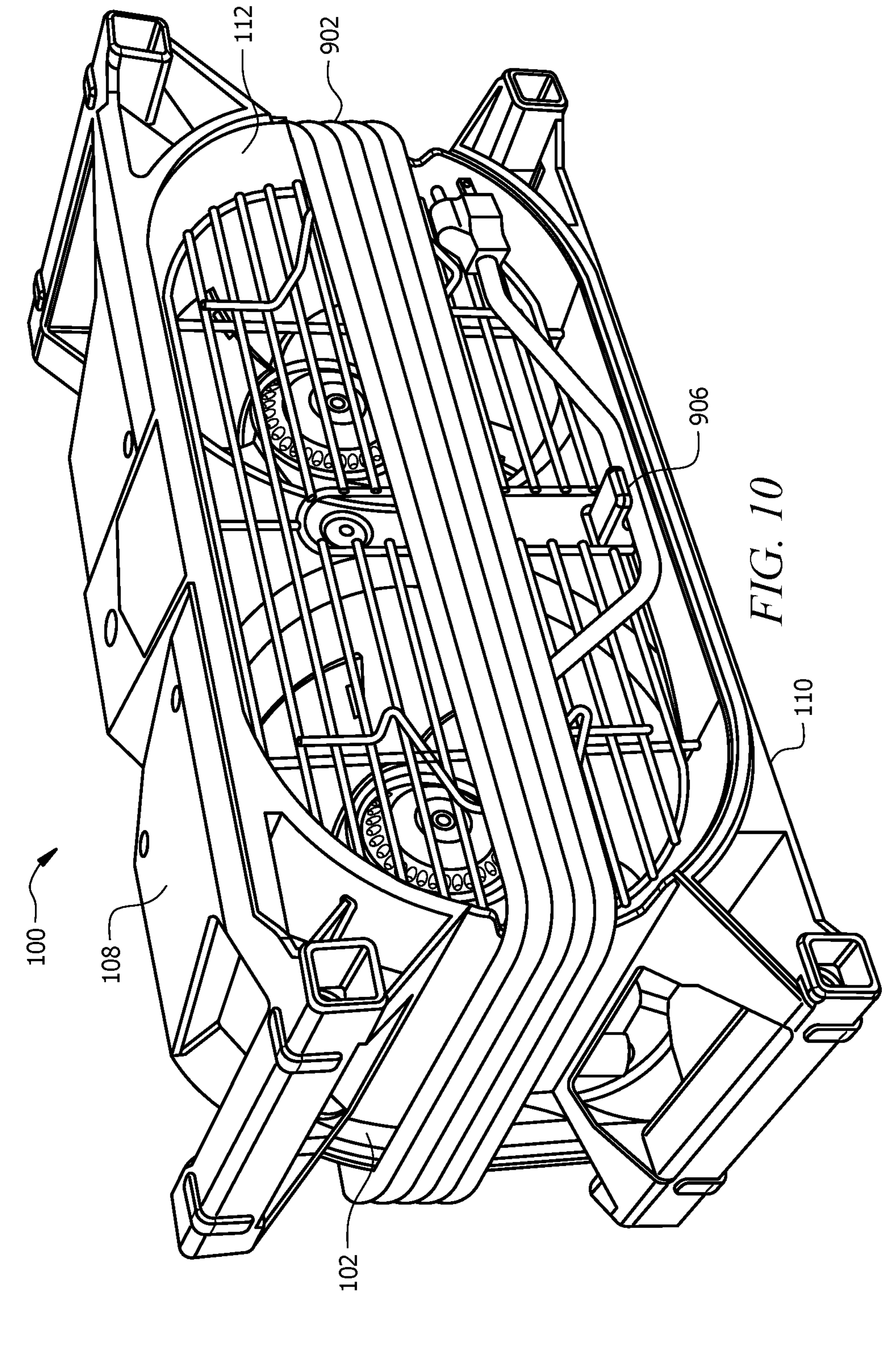
FIG. 10 is a perspective view of another embodiment of a cable management system for a portable blower fan assembly.

FIGS. 9 and 10 illustrate embodiments of a cable management system for the portable blower fan assembly 100. The cable management system is configured to secure a power cord 902 for the power supply 116. FIG. 9 is a perspective view of an embodiment of a cable management system for a portable blower fan assembly 100. In FIG. 9, the cable management system comprises cable supports 904 and a cable cleat 906 that are integrated with the intake grill 112 of the portable blower fan assembly 100. In this configuration, the power cord 902 can be wrapped around the cable supports 904 and the end of the power cord 902 can be secured using the cable cleat 906. In this example, the power cord 902 can be wrapped around the cable supports 904 in either a clockwise or counter-clockwise direction. In FIG. 9, the portable blower fan assembly 100 comprises two cable supports 904 and one cable cleat 906. In other examples, the portable blower fan assembly 100 may comprise any suitable number of cable supports 904 and cable cleats 906.

In one embodiment, the cable cleat 906 may comprise two parts that are formed by the joining of the housing 102 and the lower housing cover 110. For example, the housing 102 may comprise a first portion of the cable cleat 906 and the lower housing cover 110 may comprise a second portion of the cable cleat 906. In this configuration, the cable cleat 906 is formed when the housing 102 is coupled to the lower housing cover 110.

FIG. 10 is a perspective view of another embodiment of a cable management system for a portable blower fan assembly 100. In FIG. 10, the power cord 902 is wrapped around the portable blower fan assembly 100 and the end of the power cord 902 can be secured using the cable cleat 906. In other examples, the portable blower fan assembly 100 may employ any other suitable type of cable management configuration.

Surface Drying Process Using a Portable Blower Fan Assembly

Figure 11:
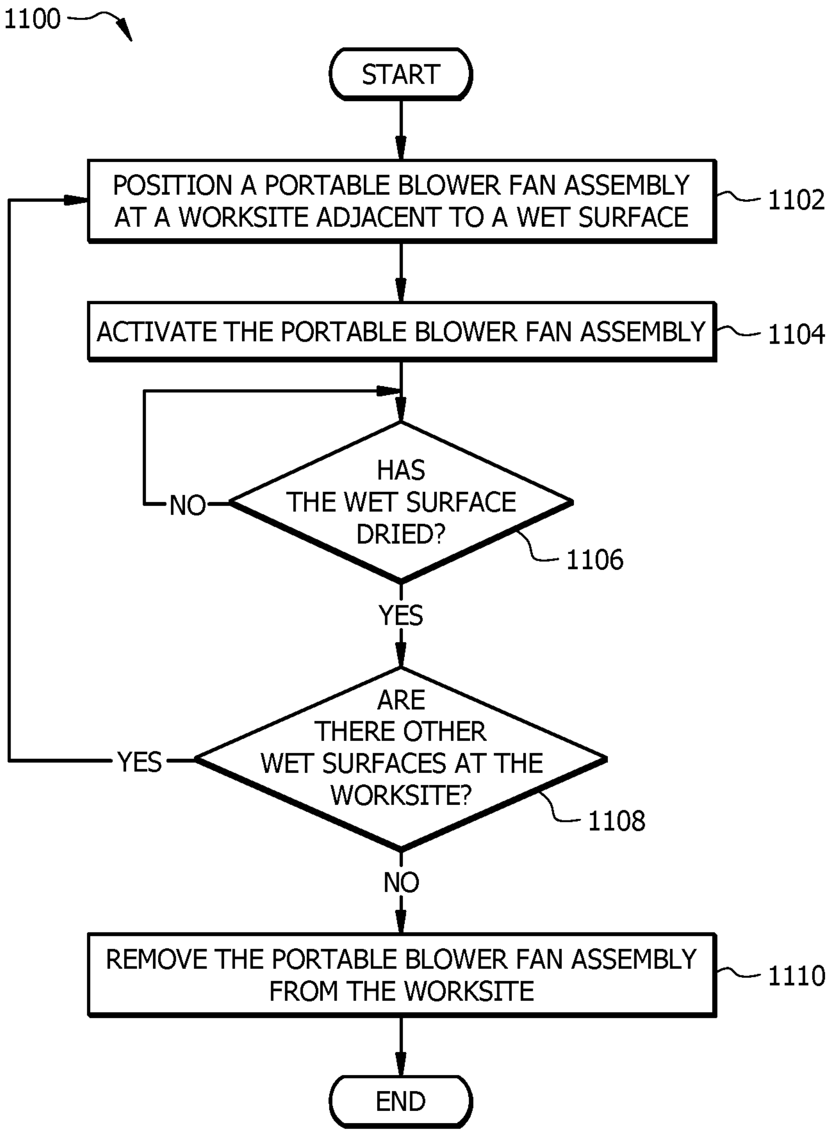
FIG. 11 is a flowchart of an embodiment of a surface drying process using a portable blower fan assembly.

FIG. 11 is a flowchart of an embodiment of a surface drying process 1100 using a portable blower fan assembly 100. In one embodiment, an operator may employ process 1100 to use a portable blower fan assembly 100 to dry one or more wet surfaces at a location. In other embodiments, the operator may use a similar process for providing airflow for ventilating an area or any other suitable type of application that requires an increase in airflow.

At step 1102, an operator positions a portable blower fan assembly 100 at a worksite adjacent to a wet surface. As an example, the operator may be at a worksite that has one or more wet surfaces. Examples of a worksite include, but are not limited to, a home, an apartment, an office, a building, or any other suitable type of location. For instance, the operator may be in a home that contains one or more wet surfaces from a flood. The operator will position a portable blower fan assembly 100 adjacent to one of the wet surfaces such that the portable blower fan assembly 100 can provide an airflow to the wet surface. As an example, the operator may position the portable blower fan assembly 100 in an orientation that is similar to the orientation shown in FIG. 3 when the wet surface is a ground surface. In this configuration, the portable blower fan assembly 100 is configured to provide an airflow path that is substantially parallel with a floor or ground surface of the worksite.

In some embodiments, the portable blower fan assembly 100 may be rotated ninety degrees from the configuration shown in FIG. 2. In this configuration, the portable blower fan assembly 100 is oriented with its fan assemblies 104 stacked on top of each other in a vertical direction. This orientation may be used to provide an airflow path that is substantially parallel with a vertical wall surface of the worksite.

As another example, the operator may position the portable blower fan assembly 100 in an orientation that is similar to the orientation shown in FIG. 7 when the wet surface is a ceiling surface or the wet surface is directly below the portable blower fan assembly 100. In this configuration, the portable blower fan assembly 100 is configured to provide an airflow path that is substantially perpendicular to a floor or ground surface of the worksite.

As another example, the operator may position the portable blower fan assembly 100 in an orientation that is similar to the orientation shown in FIG. 8 when the wet surface is a vertical surface (e.g. a wall or stairs). In this configuration, the portable blower fan assembly 100 is configured to provide an airflow path that is angled upward toward the vertical surface. In this example, the operator may position the portable blower fan assembly 100 by adjusting the length of one or more positioning legs 702 that extends outside of a channel 204 using a process similar to the process described in FIGS. 7 and 8. In other examples, the operator may position the portable blower fan assembly 100 in an orientation based on the location of the wet surface. The portable blower fan assemblies 100 may be positioned to be one foot, two feet, five feet, ten feet, or any other suitable distance away from a wet surface.

At step 1104, the operator activates the portable blower fan assembly 100. The operator may activate the portable blower fan assembly 100 by trigger the power supply 116 to provide electrical power to the fan assemblies 104A and 104B. For example, the operator may toggle a switch to trigger the power supply 116 to activate the portable blower fan assembly 100.

At step 1106, the operator determines whether the wet surface has dried. Here, the operator may periodically check the wet surface to determine whether the wet surface has dried sufficiently. The operator may check the dampness of the wet surface using a physical touch or any suitable type of device for measuring moisture. The operator may remain at step 1106 in response to determining that the wet surface has not yet dried. In this case, the operator will continue to operate the portable blower fan assembly 100 to for a period of time before checking the wet surface again to determine whether the wet surface has dried sufficiently.

Otherwise, the operator may proceed to step 1108 in response to determining that the wet surface has dried. In this case, the operator determines that the wet surface has dried sufficiently and that the portable blower fan assembly 100 is no longer needed to provide airflow to the wet surface. The operator may deactivate the portable blower fan assembly 100 by triggering the power supply 116 to disconnect electrical power to the fan assemblies 104A and 104B. For example, the operator may toggle the switch to trigger the power supply 116 to deactivate the portable blower fan assembly 100.

At step 1108, the operator may determine whether there are any other wet surfaces at the worksite. Here, the operator may check the worksite for any other wet surfaces that may require an airflow from the portable blower fan assembly 100 for drying. The operator returns to step 1102 in response to determining that there are additional wet surfaces at the worksite. In this case, the operator may reposition the portable blower fan assembly 100 adjacent to another wet surface at the worksite.

Otherwise, the operator may proceed to step 1110 in response to determining that there are no more wet surfaces at the worksite. In this case, the operator determines that all of the wet surfaces at the worksite have dried sufficiently and that the portable blower fan assembly 100 is no longer required. At step 1110, the operator removes the portable blower fan assembly 100 from the worksite. In this case, the operator may remove the portable blower fan assembly 100 from the worksite for storage or for transporting to another worksite.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A portable blower fan device, comprising: a housing comprising: a first air tunnel comprising a first intake portion and a first exhaust portion, wherein a lower portion of the housing comprises a first pair of focus corners, wherein each focus corner in the first pair of focus corners is a portion of the housing comprising a respective curved or sloped surface configured to reduce a pressure at a base of the housing, the first pair of focus corners configured to provide a first airflow path that exits the housing at a downward angle below a centerline of the portable blower fan device from the first intake portion to the first exhaust portion of the first air tunnel; and a second air tunnel comprising a second intake portion and a second exhaust portion, wherein the lower portion of the housing comprises a second pair of focus corners, wherein each focus corner in the second pair of focus corners is a portion of the housing comprising a respective curved or sloped surface configured to reduce the pressure at the base of the housing, the second pair of focus corners configured to provide a second airflow path that exits the housing at the downward angle below the centerline of the portable blower fan device from the second intake portion to the second exhaust portion of the second air tunnel; a first fan assembly disposed between first intake portion and the first exhaust portion of the first air tunnel, wherein the first fan assembly comprises a first fan blade and a first motor; and a second fan assembly disposed between the second intake portion and the second exhaust portion of the second air tunnel, wherein the second fan assembly comprises a second fan blade and a second motor; an upper housing cover coupled to an upper portion of the housing, wherein the upper housing cover comprises a first pair of channels; and a plurality of positioning legs, wherein: each positioning leg is at least partially disposed within a respective channel from among the first pair of channels; each positioning leg is configurable to extend at least partially outside of the respective channel from among the first pair of channels; and wherein each positioning leg of the plurality of positioning legs is configured with an adjustable length.

2. The device of claim 1, further comprising:

a lower housing cover coupled to a lower portion of the housing, wherein the lower housing cover comprises a second pair of channels.

3. The device of claim 2, wherein: each positioning leg is at least partially disposed within a respective channel from among the first pair of channels or the second pair of channels; and each positioning leg is configurable to extend at least partially outside of the respective channel from among the first pair of channels or the second pair of channels.

4. The device of claim 3, wherein each positioning leg of the plurality of positioning legs is configured to be removable from the respective channel from among the first pair of channels or the second pair of channels.

5. The device of claim 2, wherein the lower housing cover further comprises a plurality of vibration dampening feet.

6. The device of claim 2, wherein the upper housing cover comprises an interface configured to interlock with a lower housing cover of a second portable blower fan device.

7. The device of claim 1, further comprising:

a first curved stator vane disposed at the first exhaust portion of the first air tunnel, wherein the first curved stator vane is configured to apply a rotation to the first airflow path; and a second curved stator vane disposed at the second exhaust portion of the second air tunnel, wherein the second curved stator vane is configured to apply a rotation to the second airflow path.

8. The device of claim 1, further comprising:

an intake grill configured to cover the first intake portion of the first air tunnel and the second intake portion of the second air tunnel; and an exhaust grill configured to cover the first exhaust portion of the first air tunnel and the second exhaust portion of the second air tunnel.

9. The device of claim 8, further comprising:

a cable management system integrated with the intake grill, wherein the cable management system is configured to secure a power cord for a power supply.

10. A surface drying method, comprising: positioning a portable blower fan assembly at a worksite, wherein the portable blower fan assembly is configured to provide airflow toward a wet surface, wherein the portable blower fan assembly comprises: a housing comprising: a first air tunnel comprising a first intake portion and a first exhaust portion, wherein the first exhaust portion comprises a first pair of focus corners, wherein each focus corner in the first pair of focus corners is a portion of the housing comprising a respective curved or sloped surface configured to reduce a pressure at a base of the housing, the first pair of focus corners configured to provide a first airflow path that exits the housing at a downward angle below a centerline of the portable blower fan device from the first intake portion to the first exhaust portion of the first air tunnel; and a second air tunnel comprising a second intake portion and a second exhaust portion, wherein the second exhaust portion comprises a second pair of focus corners, wherein each focus corner in the second pair of focus corners is a portion of the housing comprising a respective curved or sloped surface configured to reduce a pressure at a base of the housing, the second pair of focus corners configured to provide a second airflow path that exits the housing at the downward angle below the centerline of the portable blower fan device from the second intake portion to the second exhaust portion of the second air tunnel; a first fan assembly disposed between the first intake portion and the first exhaust portion of the first air tunnel, wherein the first fan assembly comprises a first fan blade and a first motor; a second fan assembly disposed between the second intake portion and the second exhaust portion of the second air tunnel, wherein the second fan assembly comprises a second fan blade and a second motor; an upper housing cover coupled to an upper portion of the housing, wherein the upper housing cover comprises a first pair of channels; and a plurality of positioning legs, wherein: each positioning leg is at least partially disposed within a respective channel from among the first pair of channels; each positioning leg is configurable to extend at least partially outside of the respective channel from among the first pair of channels; and wherein each positioning leg of the plurality of positioning legs is configured with an adjustable length; activating the portable blower fan assembly for a period of time; and deactivating the portable blower fan assembly after the period of time has elapsed.

11. The method of claim 10, wherein positioning the portable blower fan assembly at the worksite comprises positioning the portable blower fan to provide an airflow path that is substantially parallel with a floor of the worksite.

12. The method of claim 10, wherein positioning the portable blower fan assembly at the worksite comprises positioning the portable blower fan to provide an airflow path that is substantially perpendicular to a floor of the worksite.

13. The method of claim 10, wherein the portable blower fan assembly further comprises: a lower housing cover coupled to a lower portion of the housing, wherein the lower housing cover comprises a second pair of channels.

14. The method of claim 13, wherein: each positioning leg is at least partially disposed within a respective channel from among the first pair of channels or the second pair of channels; and each positioning leg is configurable to extend at least partially outside of the respective channel from among the first pair of channels or the second pair of channels.

15. The method of claim 14, wherein positioning the portable blower fan assembly at the worksite comprises positioning the portable blower fan to provide an airflow path with an upward angle using the plurality of positioning legs.

16. The method of claim 14, wherein each positioning leg of the plurality of positioning legs is configured to be removable from the respective channel from among the first pair of channels or the second pair of channels.

17. The method of claim 10, wherein the portable blower fan assembly further comprises:

a first curved stator vane disposed at the first exhaust portion of the first air tunnel, wherein the first curved stator vane is configured to apply a rotation to the first airflow path;

a second curved stator vane disposed at the second exhaust portion of the second air tunnel, wherein the second curved stator vane is configured to apply a rotation to the second airflow path.

18. The method of claim 10, wherein the portable blower fan assembly further comprises:

an intake grill configured to cover the first intake portion of the first air tunnel and the second intake portion of the second air tunnel; and an exhaust grill configured to cover the first exhaust portion of the first air tunnel and the second exhaust portion of the second air tunnel.

* * * * *